United States Patent
Pearson

(10) Patent No.: US 7,664,248 B2
(45) Date of Patent: Feb. 16, 2010

(54) CALL FORWARDING TO VOICE MAIL SYSTEMS BASED ON REDIRECTING NUMBER

(75) Inventor: Larry B Pearson, San Antonio, TX (US)

(73) Assignee: AT&T Intellectual Property I, LP, Reno, NV (US)

(*) Notice: Subject to any disclaimer, the term of this patent is extended or adjusted under 35 U.S.C. 154(b) by 831 days.

(21) Appl. No.: 10/725,956

(22) Filed: Dec. 2, 2003

(65) Prior Publication Data

US 2005/0117731 A1    Jun. 2, 2005

(51) Int. Cl.
```
H04M 3/42    (2006.01)
H04M 7/00    (2006.01)
H04M 1/64    (2006.01)
H04L 12/58   (2006.01)
H04M 1/725   (2006.01)
H04M 1/663   (2006.01)
H04M 11/10   (2006.01)
```
(52) U.S. Cl. .............. 379/211.02; 379/67.1; 379/88.11; 379/88.12; 379/212.01; 379/221.01; 455/412.1; 455/412.2; 455/413
(58) Field of Classification Search ............ 379/211.02, 379/9, 207.02, 220.01, 221.01, 67.1, 88.17, 379/212.01, 88.12, 88.11, 88.22, 88.25, 88.16; 455/414.4, 413, 432.3, 412.1, 412.2; 709/223
See application file for complete search history.

(56) References Cited

U.S. PATENT DOCUMENTS

| | | | |
|---|---|---|---|
| 5,963,864 A | 10/1999 | O'Neil et al. | |
| 6,249,815 B1 * | 6/2001 | Foladare et al. | 709/223 |
| 6,374,102 B1 | 4/2002 | Brachman et al. | |
| 6,408,177 B1 * | 6/2002 | Parikh et al. | 455/414.4 |
| 6,463,145 B1 | 10/2002 | O'Neal et al. | |
| 6,678,515 B1 * | 1/2004 | Gillespie et al. | 455/412.1 |
| 6,987,962 B1 * | 1/2006 | McConnell | 455/413 |
| 7,142,657 B2 * | 11/2006 | Woodson et al. | 379/211.02 |
| 2002/0031207 A1 * | 3/2002 | Lin | 379/88.17 |
| 2002/0168061 A1 * | 11/2002 | Bruening et al. | 379/220.01 |
| 2003/0099341 A1 * | 5/2003 | Williams | 379/211.02 |
| 2004/0062376 A1 * | 4/2004 | Woodson et al. | 379/221.01 |
| 2004/0105536 A1 * | 6/2004 | Williams | 379/211.02 |
| 2004/0114730 A1 * | 6/2004 | Koch et al. | 379/9 |
| 2005/0111646 A1 * | 5/2005 | Bishop et al. | 379/207.02 |
| 2007/0082668 A1 * | 4/2007 | Silver et al. | 455/432.3 |
| 2007/0127636 A1 * | 6/2007 | Adamczyk et al. | 379/67.1 |

\* cited by examiner

*Primary Examiner*—Thjuan K Addy
(74) *Attorney, Agent, or Firm*—Toler Law Group

(57) ABSTRACT

A method and system is presented to route calls to a voicemail system. The method includes receiving a call from an originating device at a first redirecting device and forwarding the call from the first redirecting device to a second redirecting device. The forwarded call has an associated data message that includes a calling number of the originating device and the first redirecting number of the first redirecting device. The method also includes forwarding the call from the second redirecting device to a destination voice mailbox. The destination voice mailbox is selected based on an evaluation of the first redirecting number and the second redirecting number.

20 Claims, 4 Drawing Sheets

CALL FORWARDING TO VOICE MAIL SYSTEMS BASED ON REDIRECTING NUMBER

FIELD OF THE DISCLOSURE

The present disclosure relates to call forwarding based on redirecting numbers and to voice mail systems.

BACKGROUND

Call forwarding has been used to route calls from an unused telephone device to a different phone where the user expects to be available. Voice mail systems are used to handle calls where the user is busy or is unable to answer. Call forwarding systems can route calls from many different devices to a single device that is directed to a voice mail system. While such systems are useful, users may have multiple voice mail accounts and may desire increased call forwarding and voicemail call retrieval options.

Accordingly, there is a need for an improved system and method relating to handling forwarded calls and voice mail systems.

DETAILED DESCRIPTION

The present disclosure is generally directed to a method and system to route calls to a voicemail system. In a particular embodiment, the method includes receiving a call from an originating device at a first redirecting device and forwarding the call from the first redirecting device to a second redirecting device. The forwarded call has an associated data message that includes a calling number of the originating device and the first redirecting number of the first redirecting device. The method also includes forwarding the call from the second redirecting device to a destination voice mailbox. The destination voice mailbox is selected based on an evaluation of the first redirecting number and the second redirecting number.

Figure 1:
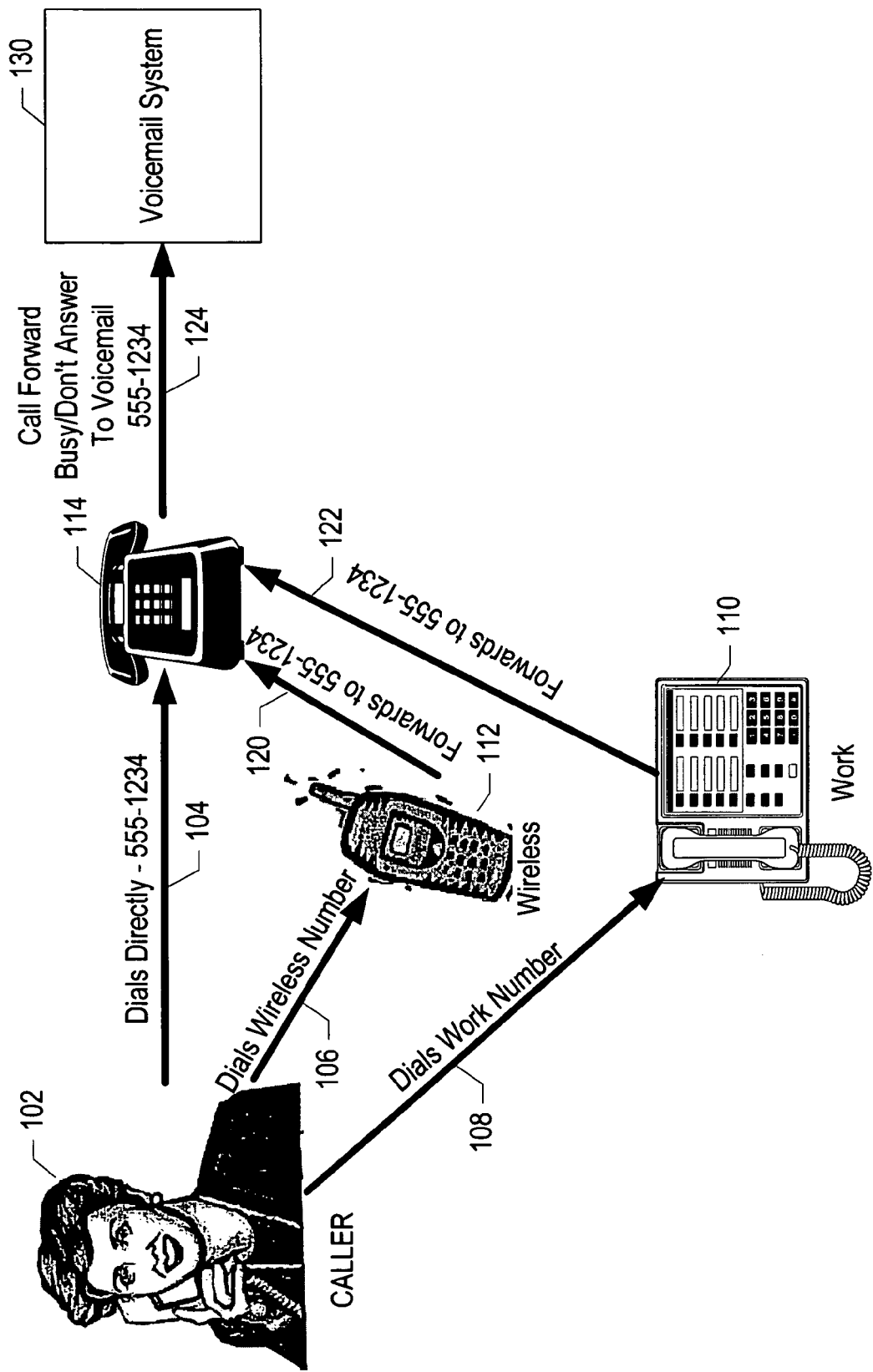
FIG. 1 is a general diagram that illustrates call forwarding to a destination voicemail system.

Referring to FIG. 1, a general diagram that illustrates various call paths from a caller 102 to a final destination voicemail system 130 is illustrated. A first call path 104 from a caller 102 is a direct call path to a destination telephone device 114 that forwards calls from the telephone 114, under busy/don't answer condition, to a voicemail system 130 via a forwarding call path 124. In another call scenario, the call is directed from caller 102 via a wireless path 106 to a wireless device 112 and then forwarded along path 120 to the destination telephone 114 before being forwarded over path 124 to the voicemail system 130. In another scenario, a call is placed from caller 102 over a call path 108 to work telephone device 110 and then forwarded over call path 122 to the destination telephone 114. The call at that point may then be forwarded over path 124 to the voicemail system 130. In each of the call scenarios, a different voicemail system account within the voicemail system 130 may be utilized. For example, a first default voicemail account may be for calls placed directly along path 104, the second account may be for wireless call forwarded numbers, and a third voicemail account may be used for calls forwarded from the work subscriber unit 110.

Figure 2:
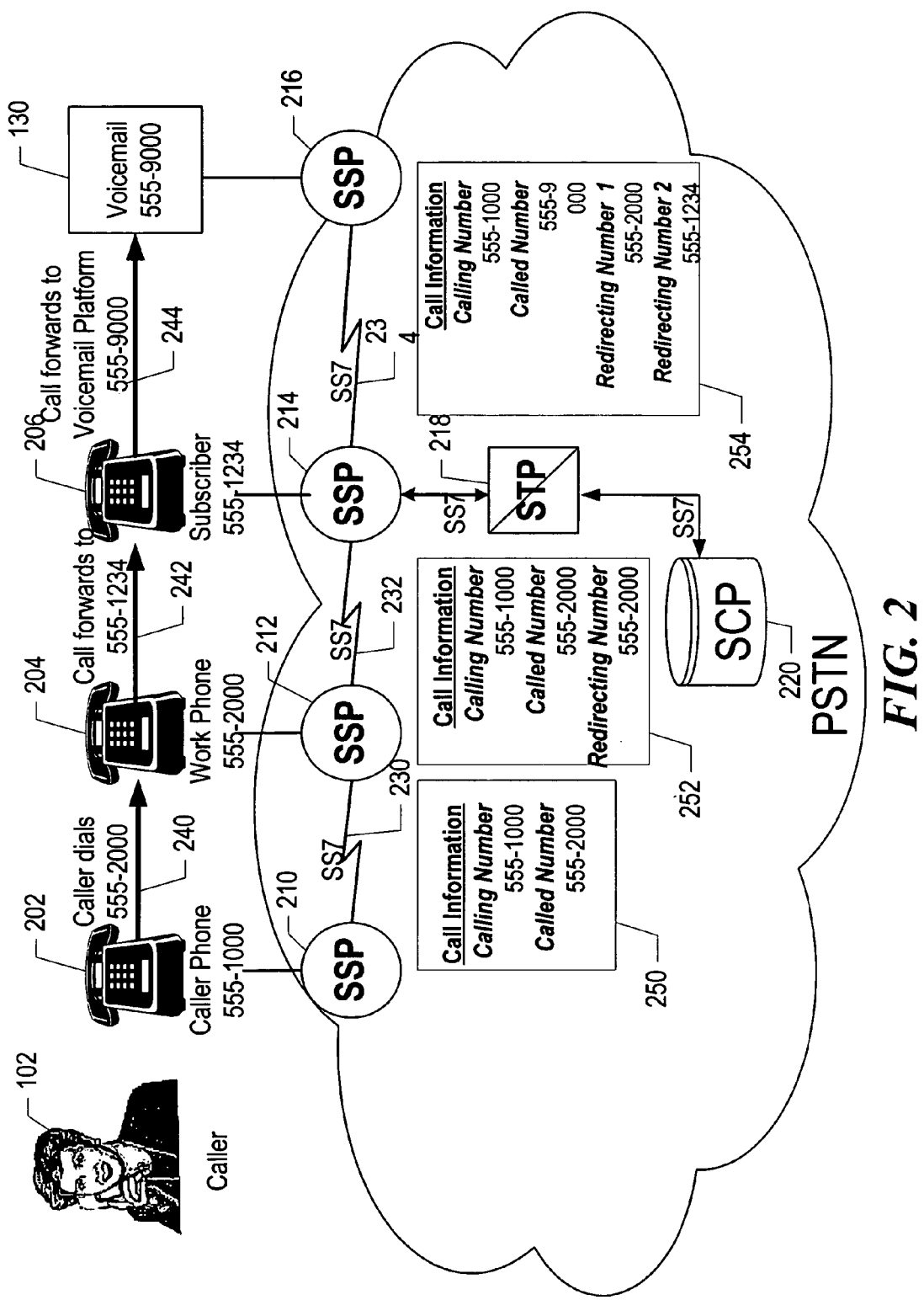
FIG. 2 is a general diagram that illustrates a system for handling call forwarding using a redirecting number to a voice mail system.

Referring to FIG. 2, an illustrative system for implementing call forwarding to various voicemail box addresses is illustrated. The system includes a first representative telephone device 202, a second telephone device 204, a subscriber telephone device 206, and the destination voicemail system 130. The system also includes a first service switching point (SSP) 210, a second SSP 212, a third SSP 214, and a fourth SSP 216. The first SSP 210 is associated with the first telephone 202, the second SSP 212 is associated with the forwarding phone 204, and a third SSP 214 is associated with the destination subscriber phone 206. The fourth SSP 216 is coupled to and associated with the voicemail system 130. The first SSP 210 is coupled to the second SSP 212 via an intermediate signaling system seven (SS7) link 230. Similarly, the second SSP 212 is coupled to SSP 214 via SS7 link 232 and SSP 214 is coupled to SSP 216 via SS7 link 234. During operation, a call is forwarded from caller 102 through the caller's phone 202 along first call path 240 to the intermediate forwarding device 204 and then via a call forwarded path 242 to the subscriber device 206. The call is then forwarded from the subscriber device 206 and based on the scenario, such as call forward, busy or where there is no answer in a certain number of rings, the call is sent over call forwarding path 244 to the voicemail system 130.

While the call is being placed from the caller 102 through the various telephone devices to the voicemail system 130, data messaging occurs among the associated SSPs. For example, the first SSP 210 sends a data message over SS7 link 230 to the SSP 212. A data message 250 includes a calling number and the called number. Along the call forwarding path, the second SSP 212 sends a call forwarding message 252 over SS7 link 232 to the third SSP 214. The call forwarding message 252 includes a redirecting number as well as the calling number and the called number. The redirecting number is the number of the intermediate call forwarding device, such as the illustrated work phone 204. The third SSP 214 that is associated with the end subscriber device 206 is coupled to a switch control point (SCP) 220 via an intermediate switch transfer point (STP) 218. The switching control point 220 includes logic to respond to trigger requests from SSP elements. For example, the SSP 214 may send a trigger request via STP 218 to the SCP 220. In response to the request, the SCP 220 performs logic operations and determines an instruction message which is then passed back to the SSP 214 for further action.

In response to the instructions from the SCP 220, the SSP 214 sends a call forwarding voicemail data message 254 to the SSP 216. The call forwarding voicemail message 254 includes a first redirecting number and a second redirecting number as well as the calling number and the called number. The second redirecting number is the telephone address for the end subscriber device 206 in the particular embodiment illustrated in FIG. 2. The SSP 216, in response to the instruction forwarded from the SCP 220 and in response to the first and second redirecting numbers, then provides an instruction to the voicemail system 130 so that the forwarded call placed along call forwarding path 244 is routed to the appropriate voicemail box. For example, in the particular embodiment shown in FIG. 2, since the call was forwarded via the work phone 204, the call would be forwarded to a special voicemail account that plays an announcement intended for callers to the subscriber's work phone 204. A special voicemail box is used instead of the default home mailbox used for direct calls to the subscriber.

With different voicemail boxes used for different call flows, a subscriber may create different announcements and may monitor and track various voicemail messages in a logical organized fashion. For example, a subscriber may retrieve work directed messages separately from the home messages. Similarly, a subscriber may define a special voicemail account for calls forwarded from the subscriber's mobile device.

Figure 3:
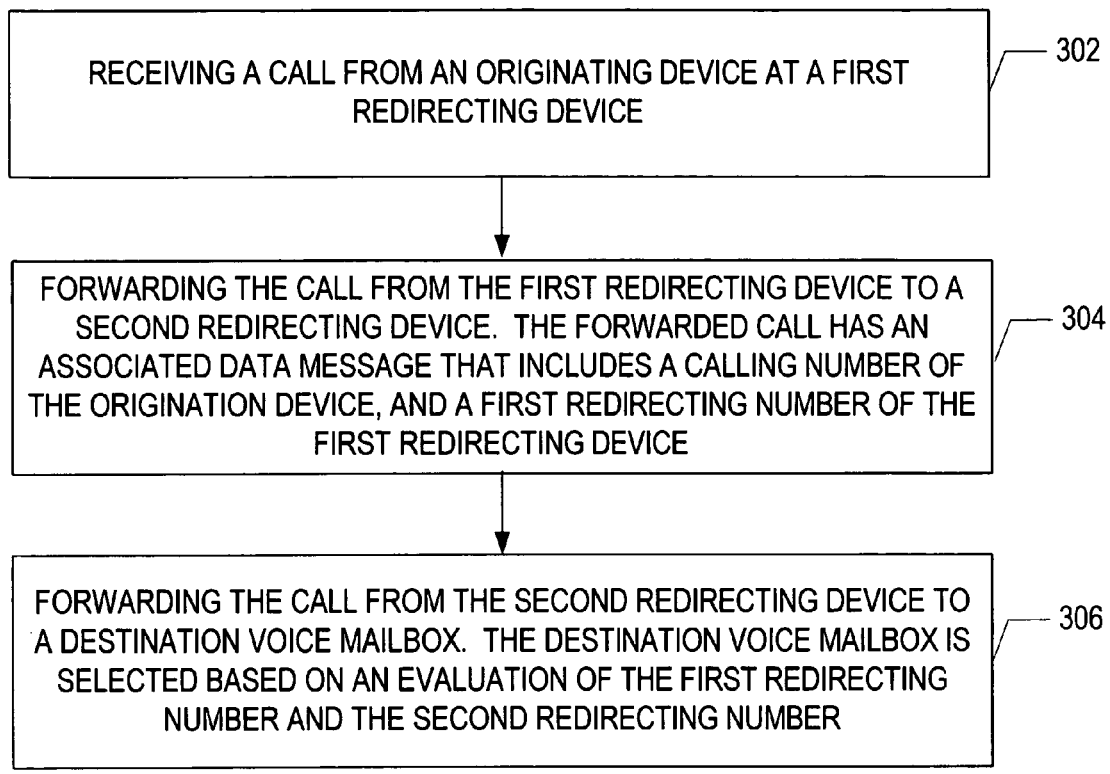
FIG. 3 is a flow chart that illustrates routing forwarded calls using a redirecting number.

Referring to FIG. 3, a method of routing a call to a voicemail box based on redirecting number is illustrated. A call is received from the originating device at a first redirecting device, at 302. The call is then forwarded from the first redirecting device to a second redirecting device, at 304. The forwarded call has an associated data message that includes a calling number of the originating device and a first redirecting number of the first redirecting device. For example, the first redirecting number may be a telephone number associated with a work phone or with a mobile phone. The call is then forwarded from the second redirecting device to a destination voicemail system, at 306. The particular destination voicemail box is selected based on an evaluation of both the first redirecting number and the second redirecting number. For example, the first redirecting number may be the work phone number and the second redirecting number may be the subscriber destination number. The voicemail system may forward the call to a designated work phone voicemail box based on the evaluation of the first redirecting number. Optionally, the redirecting number is compared to an authorized list of available redirecting numbers. If the redirecting number is not authorized, the default voicemail box is used.

Figure 4:
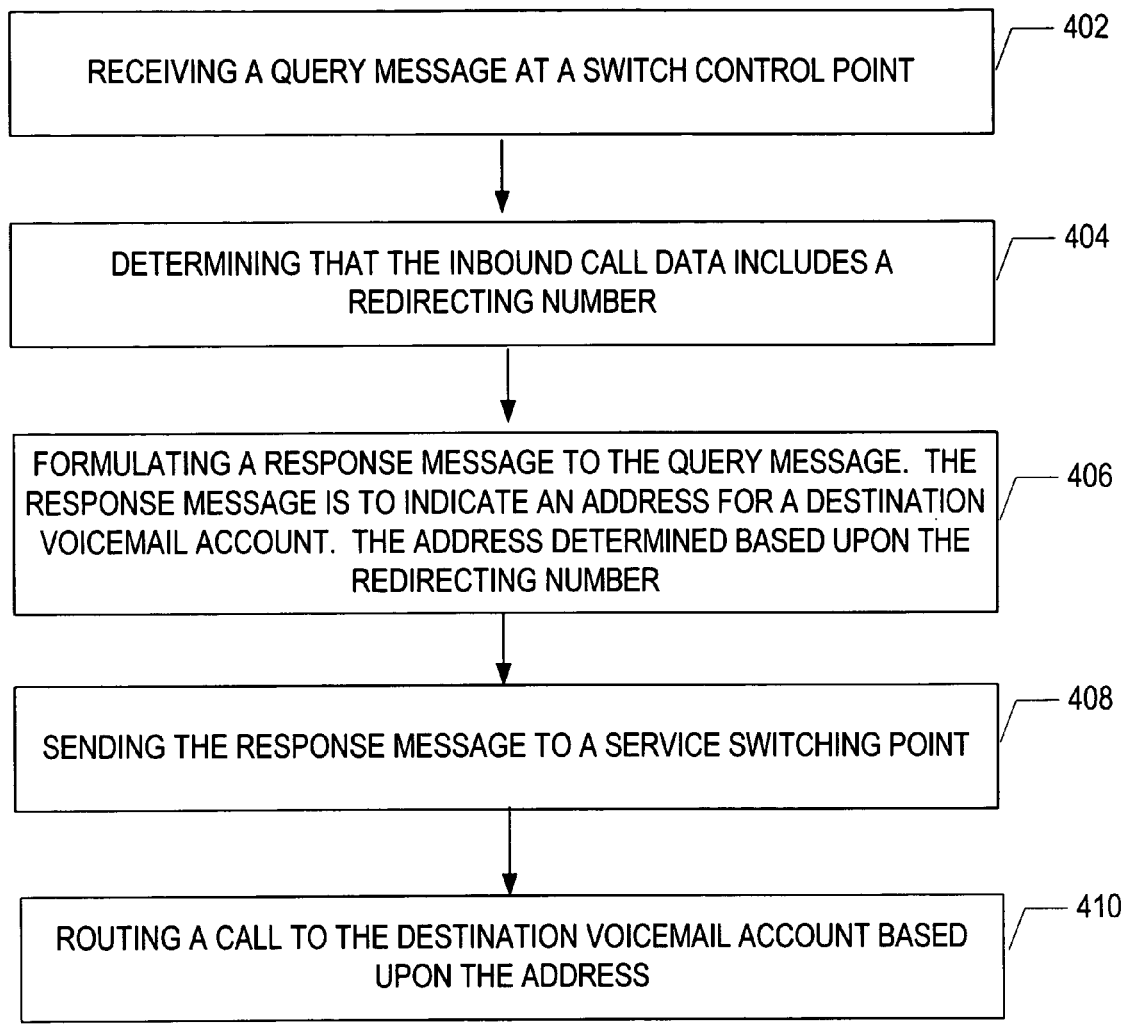
FIG. 4 is a flow chart that illustrates a method of handling intelligent network messages for forwarding calls using a redirecting number.

Referring to FIG. 4, a method of processing an intelligent network communication message is illustrated. A query message is received at a switch control point, at 402. It is determined whether the inbound call data includes a redirecting number, at 404. A response message is formulated to the query message to indicate an address for the destination voicemail account, at 406. The address may be generated by replacing the default voicemail number with the first redirecting number. The address is determined based upon the redirecting number. The response message is then sent to a service switching point, at 408 and a call is routed to the destination voicemail account based upon the address, at 410. Thus, a particular illustrative embodiment of a system and method for forwarding to a voicemail system has been disclosed. While an intelligent network example implementation was provided, it should be understood that the method and system disclosed may be implemented in many alternative systems, such as using a voice over internet protocol system.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of routing a call to a voice mailbox based on a redirecting number, the method comprising:
   receiving a call from an originating telephone device at a first redirecting telephone device;
   forwarding the call from the first telephone redirecting device to a second telephone redirecting device, the forwarded call having an associated data message that includes a calling number of the originating telephone device and a first redirecting number of the first redirecting telephone device; and
   forwarding the call from the second redirecting telephone device to a destination voice mailbox, the destination voice mailbox selected from a plurality of voice mailboxes associated with a user, the destination voice mailbox selected based on an evaluation of the first redirecting number and a second redirecting number.

2. The method of claim 1, wherein at least one of the first and the second redirecting numbers is compared to a set of predetermined authorized redirecting numbers and wherein the voice mailbox is selected from a group of available voice mailboxes based upon at least one of the first and the second redirecting numbers.

3. A method of processing an intelligent network communication, the method comprising:
   receiving a query message at a switch control point;
   determining that inbound call data includes a first redirecting number of a first telephone redirecting device;
   formulating a response message to the query message, the response message to indicate an address of a destination voicemail account, wherein the destination voicemail account is one of a plurality of voicemail accounts associated with a user, the address determined based upon the first redirecting number of the first telephone redirecting device and a second redirecting number of a second telephone redirecting device;
   sending the response message to a service switching point; and
   routing a call to the destination voicemail account based upon the address.

4. The method of claim 3, further comprising comparing the second redirecting number to a plurality of authorized redirecting numbers.

5. The method of claim 4, wherein the response message indicates forwarding the call to the destination voicemail account only when the second redirecting number is found within the plurality of authorized redirecting numbers.

6. An intelligent network system comprising:
   a switching control point;
   a service switching point coupled to the switching control point;
   wherein the service switching point is operative to send a request message to the switching control point, the request message including a subscriber telephone number and a redirecting number of a telephone redirecting device; and
   wherein the switching control point is operative to send a response message to the service switching point based on an evaluation of the redirecting number and a second redirecting number of a second telephone redirecting device, the response message including a field to identify a number associated with a voicemail account, wherein the voicemail account is one of a plurality of voicemail accounts associated with a user.

7. The system of claim 6, wherein the service switching point is coupled to a second service switching point that is coupled to a destination voicemail system.

8. The system of claim 6, wherein the service switching point receives a data message associated with a call prior to sending the request message to the switching control point.

9. The system of claim 7, wherein the service switching point is coupled to a signaling system 7 type of communication link.

10. The system of claim 8, wherein the call is routed to a default home voicemail system when the second redirecting number is not found in an authorized list of redirecting numbers.

11. The system of claim 7, wherein the second service switching point receives a message that includes a calling number, a called number, the redirecting number, and the second redirecting number.

12. The system of claim 11, wherein the second service switching point includes a memory that stores data related to the plurality of voicemail accounts.

13. The system of claim 6, wherein the switching control point includes a memory, the memory including a first redirecting number entry associated with a first voice mailbox and a second redirecting number entry associated with a second voice mailbox.

14. The system of claim 13, wherein the first redirecting number entry is associated with a work phone and wherein the first voice mailbox is a designated work voicemail account.

15. The system of claim 14, wherein the second redirecting number entry is associated with a mobile communication device and wherein the second voice mailbox is a designated mobile communication device voicemail account.

16. The system of claim 15, wherein a first greeting is presented upon access to the first voice mailbox and a second greeting is presented upon access to the second voice mailbox.

17. The system of claim 16, wherein the memory further includes a default voicemail account associated with a home phone, wherein the default voicemail account is one of the plurality of voicemail accounts associated with a user.

18. The system of claim 17, wherein the switching control point replaces an address of the default voicemail account with an address of at least one of the first voice mailbox and the second voice mailbox.

19. The method of claim 1, further comprising presenting a first greeting upon access to the destination voice mailbox and presenting a second greeting upon access to a second voice mailbox of the plurality of voice mailboxes associated with the user.

20. The method of claim 1, wherein the second redirecting number is associated with the second telephone redirecting device.

* * * * *